United States Patent [19]
DiFrank

[11] Patent Number: 5,992,613
[45] Date of Patent: Nov. 30, 1999

[54] AIR COOLED PUSHER BAR SUPPORT FOR LEHR LOADER

[75] Inventor: Frank J. DiFrank, Toledo, Ohio

[73] Assignee: Owens-Brockway Glass Container Inc., Toledo, Ohio

[21] Appl. No.: 08/931,720

[22] Filed: Sep. 16, 1997

[51] Int. Cl.[6] .................................................. B65G 25/00
[52] U.S. Cl. ........................................ 198/430; 198/429
[58] Field of Search .................................. 198/427, 429, 198/430, 738, 740, 743, 744, 745

[56] References Cited

U.S. PATENT DOCUMENTS

| | | | |
|---|---|---|---|
| 3,184,031 | 5/1965 | Dunlap . | |
| 4,067,434 | 1/1978 | Mumford | 198/427 |
| 5,044,488 | 9/1991 | Bolin | 198/430 |
| 5,125,496 | 6/1992 | Aguirre-Gandara et al. | 198/430 |
| 5,472,077 | 12/1995 | Bolin | 198/430 |
| 5,741,343 | 4/1998 | Lloyd et al. | 198/429 X |
| 5,893,449 | 4/1999 | Leidy et al. | 198/430 |

FOREIGN PATENT DOCUMENTS 2174667  11/1986  United Kingdom .

*Primary Examiner*—James R. Bidwell

[57] ABSTRACT

A lehr loader (20) for transferring a line of freshly formed glass containers (C) on a cross-conveyor (XC) transversely of the cross-conveyor into an annealing lehr (L). The lehr loader has a superimposed stack of three carriages (48, 76, 94), the lowermost carriage (48) being supported on a frame (22) and being movable longitudinally in a horizontal plane with respect to the frame toward and away from the lehr. The intermediate carriage (76) is supported on the lowermost carriage (48) and is movable longitudinally with the lowermost carriage and is movable laterally in a horizontal plane with respect to the lowermost carriage. The uppermost carriage (94) is supported on the intermediate carriage (76) and is movable horizontally with the intermediate carriage and vertically with respect to the intermediate carriage. The uppermost carriage carries a pusher bar (120) for transferring glass containers (C) from the cross-conveyor (XC) into the lehr (L) upon motion of the lowermost carriage (48) toward the lehr. An air cooled support bar (246) surrounded by a pair of radiation shields (256, 258) is provided to prevent the support bar from being distorted due to the high temperature environment in which it must operate.

8 Claims, 13 Drawing Sheets

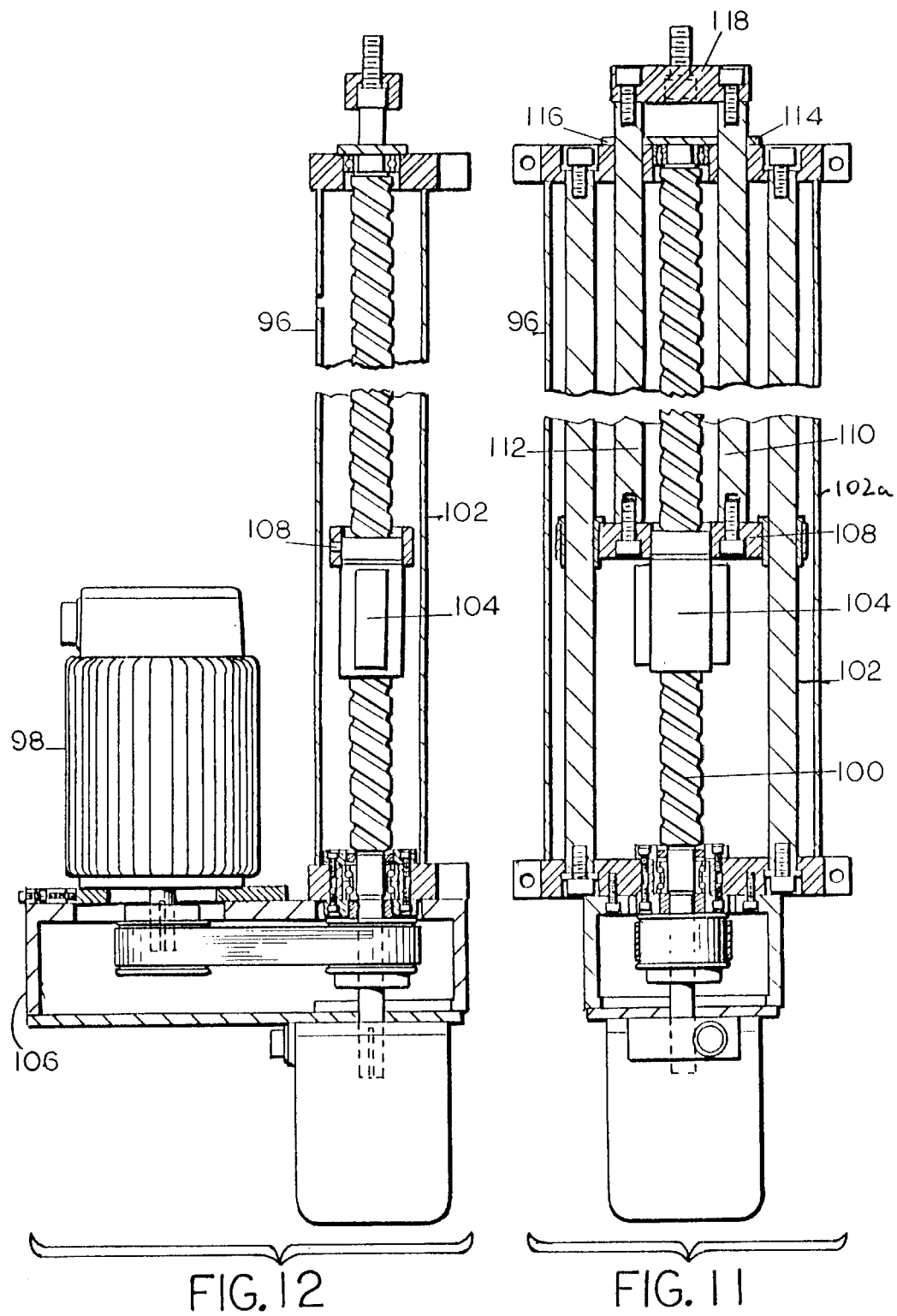

AIR COOLED PUSHER BAR SUPPORT FOR LEHR LOADER

CROSS-REFERENCE TO RELATED APPLICATION

This invention is directed to improvements in a lehr loader of the type described in co-pending U.S. patent application Ser. No. 08/854,042, which was filed on May 8, 1997.

BACKGROUND OF THE INVENTION

1. Field of the Invention

This invention relates to a transfer device for transferring articles disposed in a linear array on a conveyor transversely of the conveyor into an article processing unit. More particularly, this invention relates to a transfer device of the foregoing character for transferring freshly formed glass containers to the upper horizontal surface of a moving conveyor of an annealing lehr, namely, a type of transfer device often called a lehr loader or a stacker. In particular, this invention relates to an air cooled pusher bar support of a type used in a lehr loader or stacker of the foregoing character.

2. Description of the Prior Art

U.S. Pat. No. 5,044,488 (Bolin) discloses a lehr loader or stacker having a vertical series of driven carriages, the lowermost of which is supported by a support structure at an elevation above the floor of the plant in which the lehr loader is installed. The lowermost carriage is movable toward an adjacent annealing lehr to advance a linear series of glass containers on a conveyor, described in the reference as a cross-conveyor, positioned between the stacker and the lehr, transversely of the cross-conveyor into the lehr. An intermediate carriage is mounted on the lowermost carriage. The intermediate carriage is movable with the lowermost carriage toward and away from the lehr and is independently movable with respect to the lowermost carriage in a direction parallel to the direction of movement of the cross-conveyor to keep new containers on the cross-conveyor from piling up against a pusher bar carried by a third carriage during the motion of the lowermost carriage toward the lehr. The third carriage, which is the uppermost carriage in the series, is mounted above the intermediate carriage and is movable with the lowermost carriage and the intermediate carriage and is movable in a vertical direction independently of the intermediate carriage and the lowermost carriage to elevate the pusher bar above the tops of incoming containers on the cross-conveyor during the return of the pusher bar to a start position. The motion of each of the carriages of the stacker of the aforesaid U.S. Pat. No. 5,044,488 is actuated by an axially fixed, rotatable screw drive carried by the underlying carriage, or the support structure in the case of the drive for the lowermost carriage, and the rotatable screw is rotatable in a nut that is fixed to the driven carriage.

The rotating screw carriage drives of a stacker according to the aforesaid U.S. Pat. No. 5,044,488 have many operating advantages over other lehr loader carriage drive techniques, such as hydraulic or pneumatic cylinders or motors, in that rotating screw drives have higher starting torques and are less jerky and more controllable in their motions. Unfortunately, the environment of a glass container manufacturing facility is quite hostile to rotating screw drives of the type described in the aforesaid U.S. Pat. No. 5,044,488, due to dust or other particles that may contaminate the nut contacting surfaces of the rotatable screws, or the tendency of the rotatable screws to sling lubricant outwardly when rotating at the speeds of rotation needed for proper operation of a lehr loader, and/or the high temperatures that are inherently present in the operation of a lehr loader. Because of such problems, the inventor of the aforesaid U.S. Pat. No. 5,044,488 subsequently patented a lehr loader that substituted endless belt drives for the rotatable screw drives of the aforesaid U.S. Pat. No. 5,044,488, as is shown in U.S. Pat. No. 5,472,077 (Bolin). However, the use of endless drives to drive the carriages of a lehr loader introduces other problems into the operation of a lehr loader, such as the inherent low starting torques of such drives and problems encountered in accurately controlling the positions of the movable carriages due to the stretching of belts in a belt-driven system or the backlash between chains and drive sprockets in a chain-driven system.

The pusher bar support of a lehr loader of the type described is quite long and is subject to a high temperature environment due to its proximity to freshly formed glass containers, which still retain a high degree of the heat required for their molding from gobs of molten glass, and to its proximity to the inlet end of an annealing lehr, which must be operated at an elevated temperature to properly anneal the containers. For example, the typical lehr loader pusher bar support operates in an environment where the temperature often reaches at least 400° F., and in some instances up to approximately 1000° F. If the pusher bar support is not continuously cooled during its operation, it is subject to warpage or other forms of thermal distortion.

Other lehr loaders are disclosed in U.S. Pat. Nos. 4,067,434 (Mumford) and 3,184,031 (Dunlap), which were assigned to the assignee of this application or one of its predecessors, the disclosure of each of which is incorporated by reference herein, and in published UK Patent application GB 2174667A.

BRIEF DESCRIPTION OF THE INVENTION

The aforesaid and other problems associated with prior art lehr loader devices are overcome by a lehr loader according to the present invention in which the reciprocating motion of each of three superimposed movable carriages is actuated by an axially fixed, rotatable screw that rotates in a nut, which drives a spaced apart pair of parallel drive rods. The rotatable screw and nut are enclosed within a housing, and the drive rods extend from the housing, through appropriate seals to maintain lubricant within the housing and prevent dirt or other debris from entering into the housing. The housing for each rotatable screw and drive nut assembly is secured to the underlying carriage, or to the support structure in the case of the drive assembly for the lowermost movable carriage, and the free ends of the drive rods are secured to the overlying movable carriage.

The use of enclosed rotatable screw and drive nut assemblies in moving the movable carriages of a lehr loader according to the present invention makes it possible to achieve the gentle handling and cycle controllability advantages that where envisioned for the open ball screw and nut drive assemblies according to the aforesaid U.S. Pat. No 5,044,488, while avoiding the problems of lubricant and contamination of the ball screw surfaces and other maintenance problems that were encountered in the operation of devices according to the aforesaid U.S. Pat. No. 5,044,488, as were recognized in the aforesaid U.S. Pat. No. 5,472,077, which was subsequently granted in the name of the same inventor.

The problems associated with the operation of a lehr loader pusher bar support in a high temperature environment are overcome by the present invention, which utilizes a structural member for the pusher bar support surrounded by thin metallic skins spaced from the structural member, and from each other in the case of a pusher bar support using more than one of such skins, and by causing pressurized cooling air to flow in the spaces between the structural member and the surrounding metallic skin(s).

Accordingly, it is an object of the present invention to provide an improved pusher bar support for a lehr loader. More particularly, it is an object of the present invention to provide a pusher bar support of the type described that is resistant to warpage and other forms of thermal distortion while operating in a high temperature environment.

For a further understanding of the present invention and the objects thereof, attention is directed to the drawing and the follow brief description thereof, to the detailed description of the preferred embodiment of the invention and to the appended claims.

BRIEF DESCRIPTION OF THE DRAWING

FIGS. 11 and 12 are elevational views, partly in cross-section, at an enlarged scale and at right angles to one another of another actuation device used in the lehr loader of FIGS. 1–5;

DETAILED DESCRIPTION OF THE PREFERRED EMBODIMENT

Figure 1:
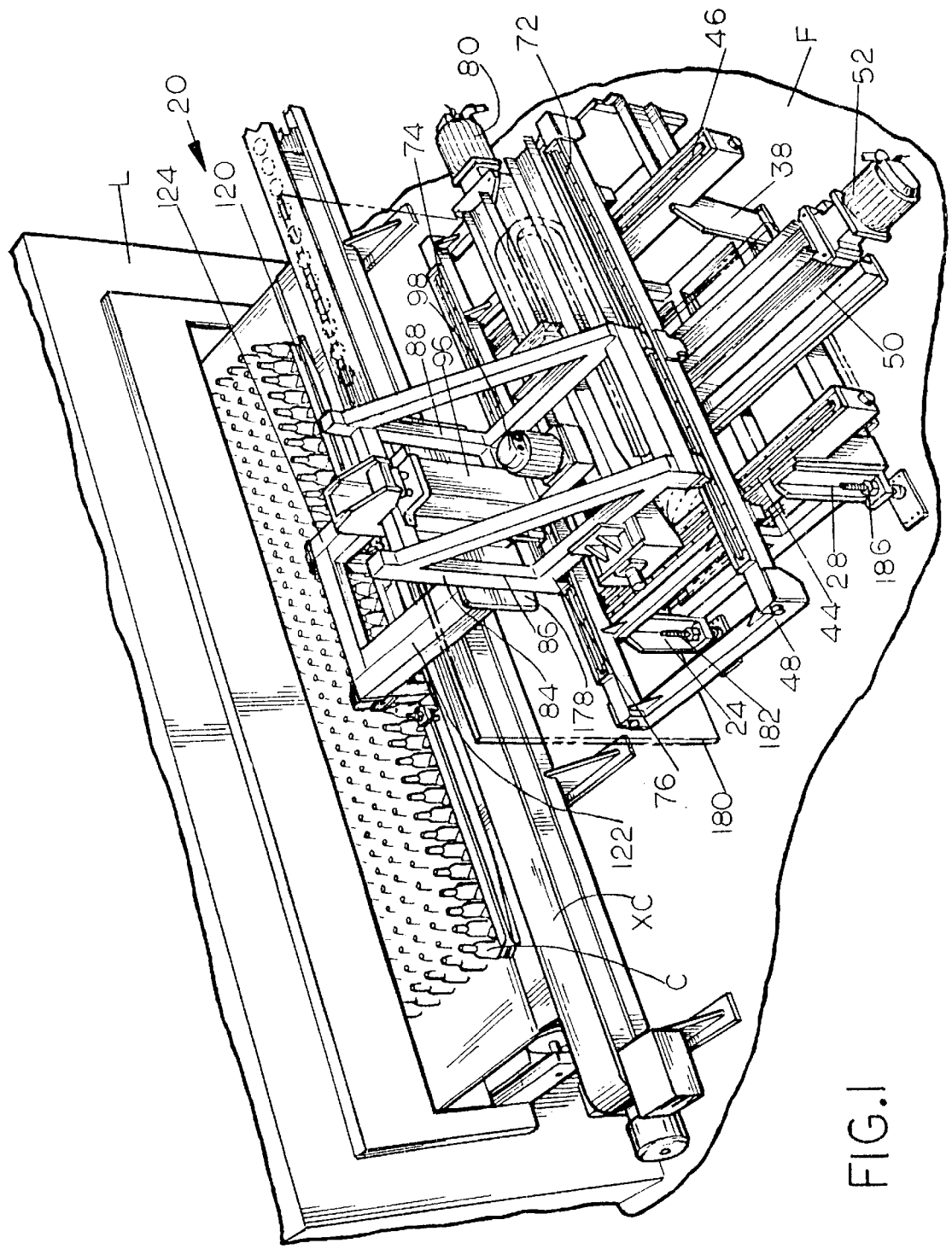
FIG. 1 is a fragmentary, perspective view of a lehr loader according to the preferred embodiment of the present invention.

A lehr loader according to the embodiment of the present invention that is described in the aforesaid co-pending U.S. patent application Ser. No. 08/854,042 is generally indicated in the drawing by reference numeral 20. The lehr loader 20 includes a frame 22, which is made up of vertically extending legs 24, 26, 28, 30, and the legs 24, 26, 28, 30 are disposed in a rectangular array. The legs 24, 26 are joined to one another by transversely extending members 32, 34, the legs 28, 30 are joined to one another by transversely extending members 36, 38, the legs 24, 28 are joined to one another by longitudinally extending members 40, 42, and the legs 26, 30 are joined together by longitudinally extending members, not shown.

The frame 22 is provided with a spaced apart pair of longitudinally extending slides 44, 46, and a generally rectangular carriage 48 is slidably mounted on the slides 44, 46. The carriage 48 is caused to reciprocate on the frame 22, toward and away from an annealing lehr L or other processing unit, by a reversible linear actuator 50 that is driven by a reversible a.c. servo motor 52 mounted in alignment with the actuator 50.

Figure 10:
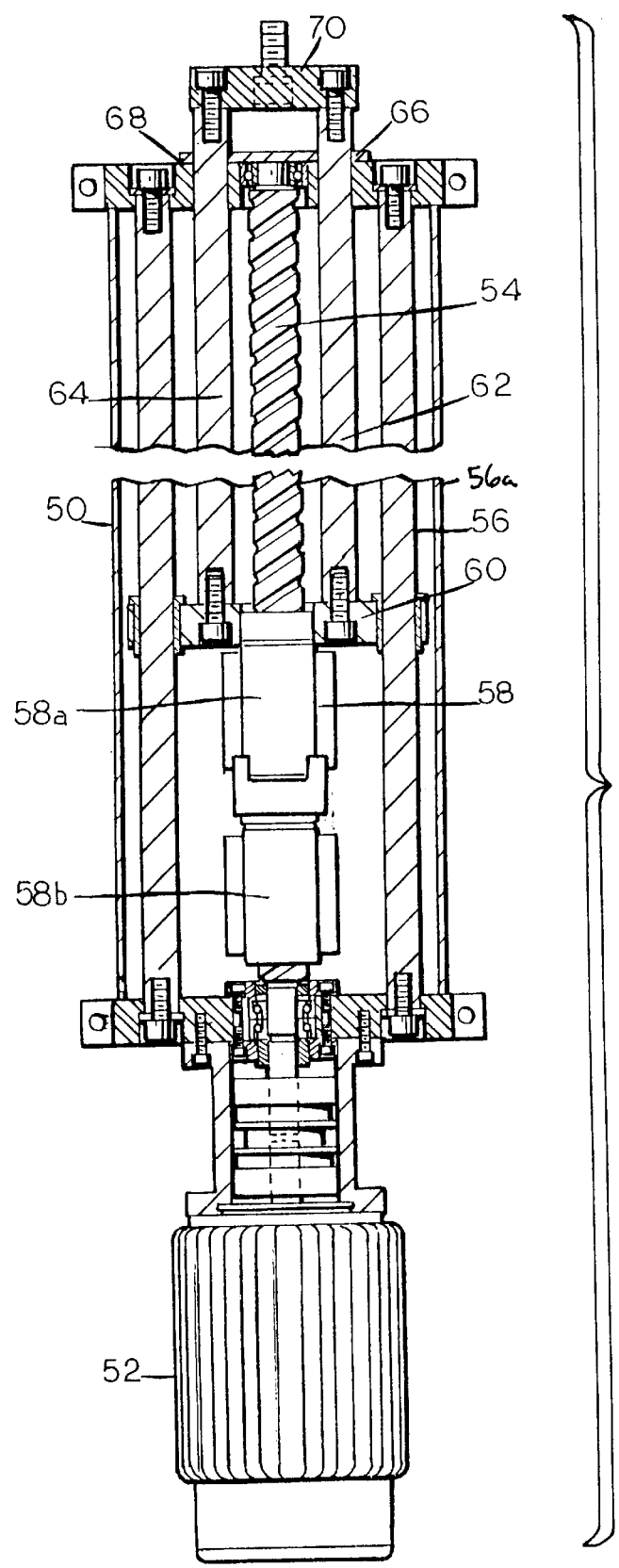
FIG. 10 is a plan view, partly in cross-section and at an enlarged scale, of an actuation device used in the lehr loader of FIGS. 1–5.

FIG. 10 illustrates a linear actuator 50 for use in the practice of the present invention, with the servo motor 52 secured thereto in axial alignment therewith, and in that case the linear actuator 50 is a ball screw mechanism with a reversible rotatable screw 54. The rotatable screw 54 is enclosed within an internally lubricated housing 56 that is secured to the frame 22, and the rotatable screw 54 rotates within a nut 58. Preferably, the nut 58 is made up of an opposed pair of nuts 58a, 58b to minimize backlash between the nut 58 and the rotatable screw. In any case, rotation of the screw 54 causes the nut 58 to advance or retract relative to the position of the servo motor 52, depending upon the direction of rotation of the screw 54.

Figure 4:
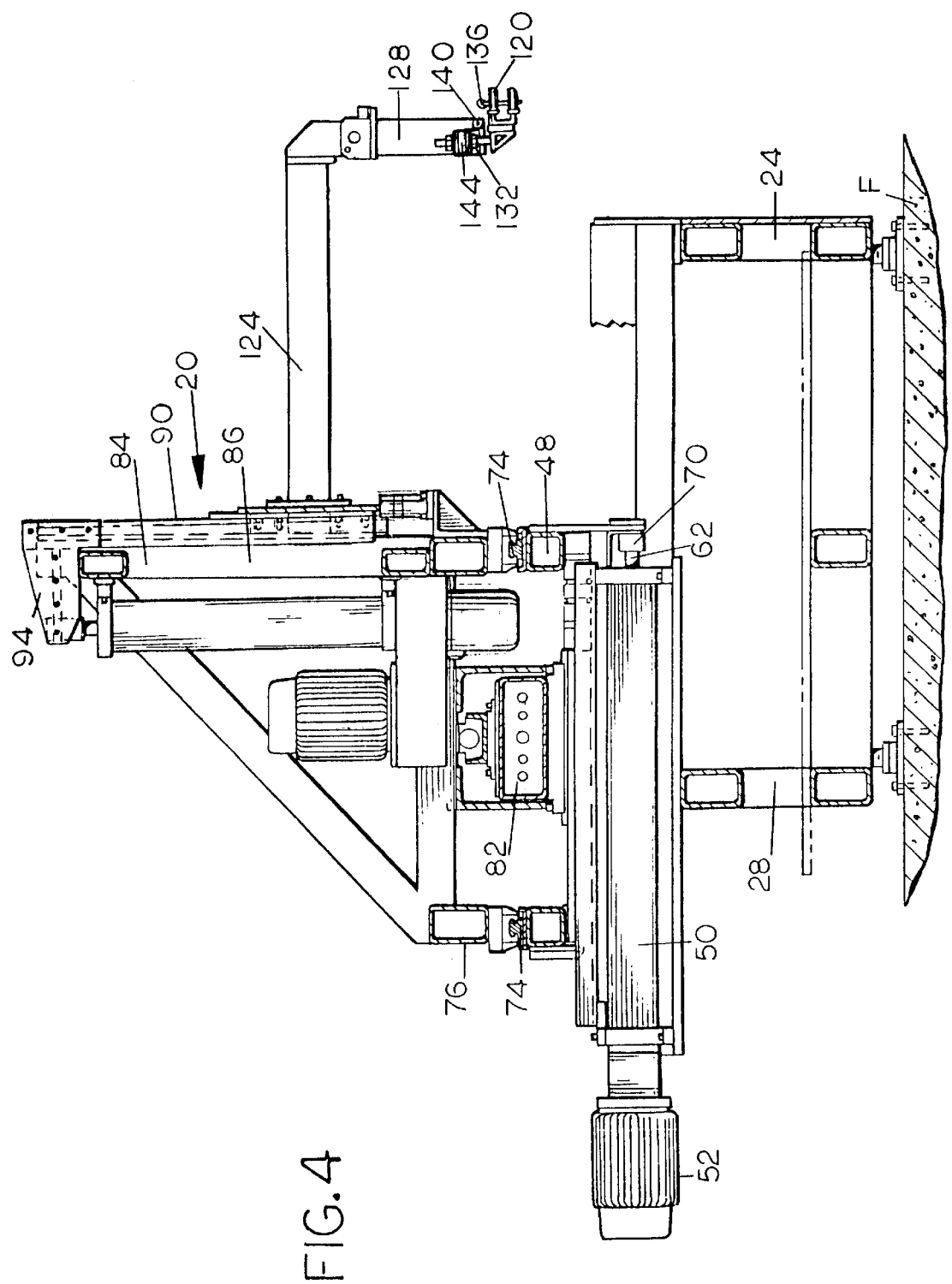
FIG. 4 is a sectional view taken on line 4—4 of FIG. 2.
Figure 5:
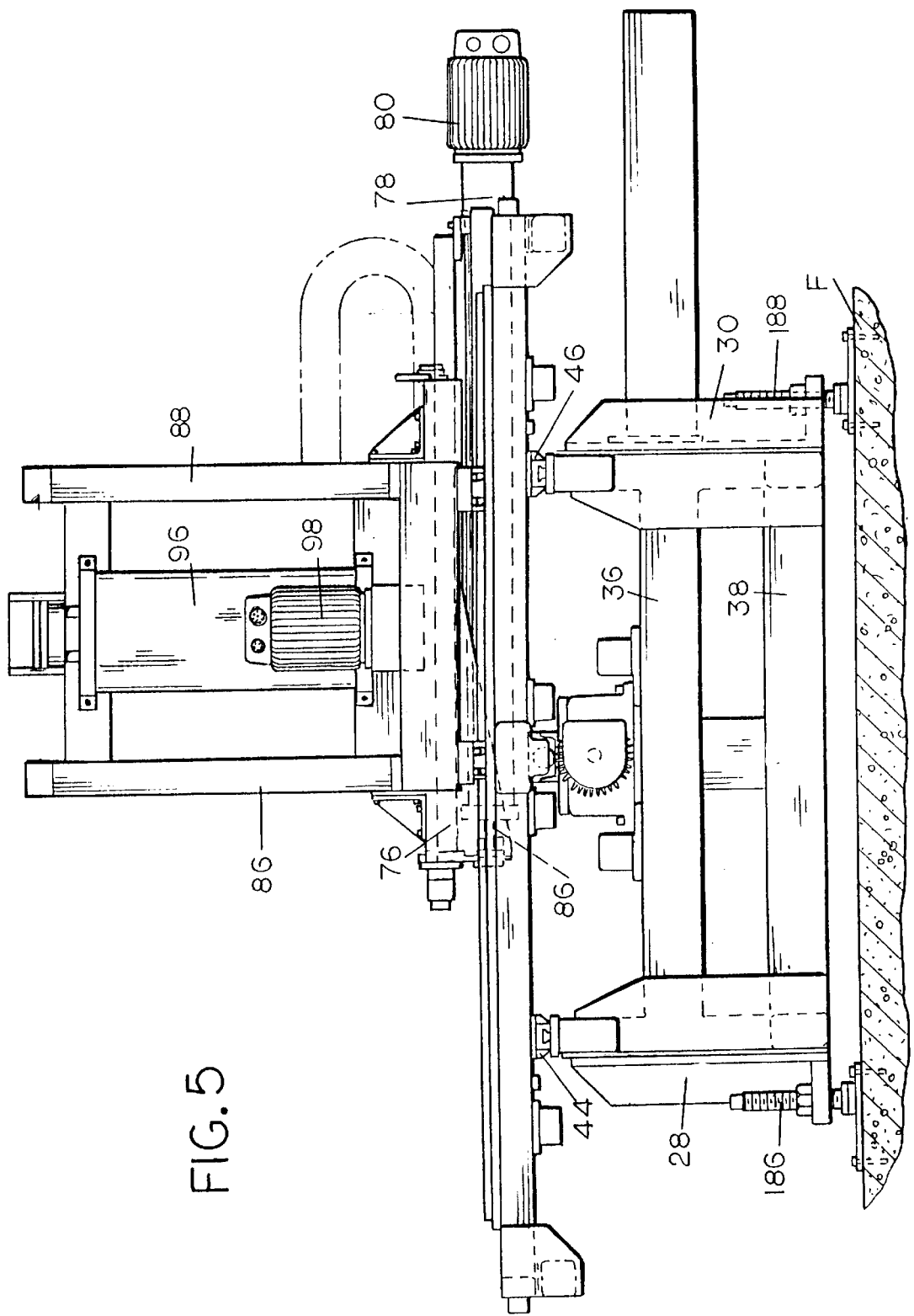
FIG. 5 is a fragmentary elevational view at an enlarged scale, of a portion of the lehr loader of FIGS. 1–4.

The nut 58 has a plate 60 secured to it, and the inner ends of a spaced apart pair of long, slender rods 62, 64 are secured to the plate 60. The outer ends of the rods 62, 64 extend beyond the housing 56 of the linear actuator 50 at all positions of the nut 58 within the housing 56, seals 66, 68 being provided in the housing 56 to sealingly accommodate the sliding motion of the rods 62, 64 with respect to the housing 56, respectively. The outer ends of the rods 62, 64 are secured to a plate 70, and the plate 70, in turn, is secured to the carriage 48, as shown in FIG. 4. Thus, reciprocation of the nut 58, as heretofore described, will cause the carriage 48 to reciprocate in a horizontal plane, toward or away from the lehr L. The use of the rods 62, 64 to longitudinally separate the nut 58 from the carriage 48 by the length of the rods 62, 64 desirably permits some degree of misalignment between the nut 58 and the carriage 48 due to the inherent flexibility of the rods 62, 64.

The linear actuator 50 of the enclosed ball screw type, as heretofore described, is available from E Drive Design, Inc. of Glastonbury, Conn., and has many advantages over an open ball screw linear actuator for use in reciprocating a carriage of a lehr loader, for example, an open ball screw linear actuator of the type disclosed in the aforesaid U.S. Pat. No. 5,044,488. Specifically, an enclosed ball screw mechanism permits continuous lubrication of the mating surfaces of the rotatable screw 54 and the nut 58, notwithstanding the tendency of the rotating screw 54 to sling lubricant outwardly therefrom due to centrifugal force when rotating at high speed, the housing 56 that encloses the screw 54 and the nut 58 protects their mating surfaces from contamination due to dust and debris that can be present in an industrial environment such as a glass container manufacturing plant, and the housing 56, together with the circulation of lubricant therethrough, protects the screw 54 and the nut 58 from overheating in an environment where they would otherwise be exposed to heat from proximity to heated containers and the inlet to the lehr L. Preferably, the housing 56 has an outer radiation shield 56a positioned therearound and spaced therefrom to reduce the transfer of heat to the interior of the linear actuator 50.

A linear actuator of the enclosed ball screw type is disclosed in U.S. Pat. No. 4,500,805 (Swanson).

The carriage 48 is provided with a spaced apart pair of laterally extending slides 72, 74 and a carriage 76 is slidably mounted on the slides 72, 74. The carriage 76 reciprocates in a longitudinal direction with the carriage 48 and is caused to reciprocate in a lateral direction with respect to the carriage 48, from side to side of the annealing lehr L, by a reversible linear actuator 78 that is driven by a reversible a.c. servo motor. The linear actuator 78 preferably is an enclosed ball screw mechanism of the type described above with respect to the linear actuator 50, and has a housing 82 that is secured to the carriage 48 and a nut (not shown) that reciprocates within the housing 82 and transmits reciprocating force to a spaced apart location of the carriage 76 by a pair of long slender rods 84, 86 whose free ends extend beyond the housing 82.

The carriage 76 has a vertically extending portion 86 that is made up of a frame with a pair of spaced apart vertically extending members 84, 88, and the vertically extending members 86, 88 are provided with vertically extending slides 90, 92, respectively. A vertically extending carriage 94 is slidably mounted on the slides 90, 92 of the carriage 76 to be movable in a vertical plane with respect to the carriage 76 as the carriage 76 is movable laterally in a horizontal plane with respect to the carriage 48 and as the carriage 76 is movable longitudinally in a horizontal plane with the carriage 48. The carriage 94 is caused to reciprocate in a vertical plane, for reasons that will later be discussed more fully, by a reversible linear actuator 96 that is driven by a reversible a.c. servo motor 98.

FIGS. 11 and 12 illustrate a linear actuator 96 for use in the practice of the present invention, with the servo motor 98 positioned out of alignment with the linear actuator 96 and parallel thereto to thereby reduce the overall height of the lehr loader 20. The linear actuator 96 is an enclosed ball screw mechanism with a reversible rotatable screw 100. The screw 100 is enclosed within an internally lubricated housing 102 that is secured to the vertically extended portion 86 of the carriage 76, and the rotatable screw 100 rotates within a nut 104. The rotation of the screw 100, thus, causes the nut 104 to advance or retract relative to the servo motor 98 depending upon the direction of rotation of the servo motor 98, whose torque is applied to the screw 100 by means of an enclosed drive assembly 106, such as a cogged timing belt drive assembly. Preferably, the housing 102 has an outer radiation shield 102a positioned therearound and spaced therefrom to reduce the transfer of heat to the interior of the linear actuator 96.

The nut 104 has a plate 108 secured to it, and the inner ends of a spaced apart pair of parallel, long slender rods 110, 112 are secured to the plate 108. The outer ends of the rods 110, 112 extend beyond the housing 102 of the linear actuator 96 at all positions of the nut 104 within the housing 102, seals 114, 116 being provided in the housing 102 to sealing accommodate the sliding motion of the rods 110, 112 with respect to the housing 102, respectively.

Figure 3:
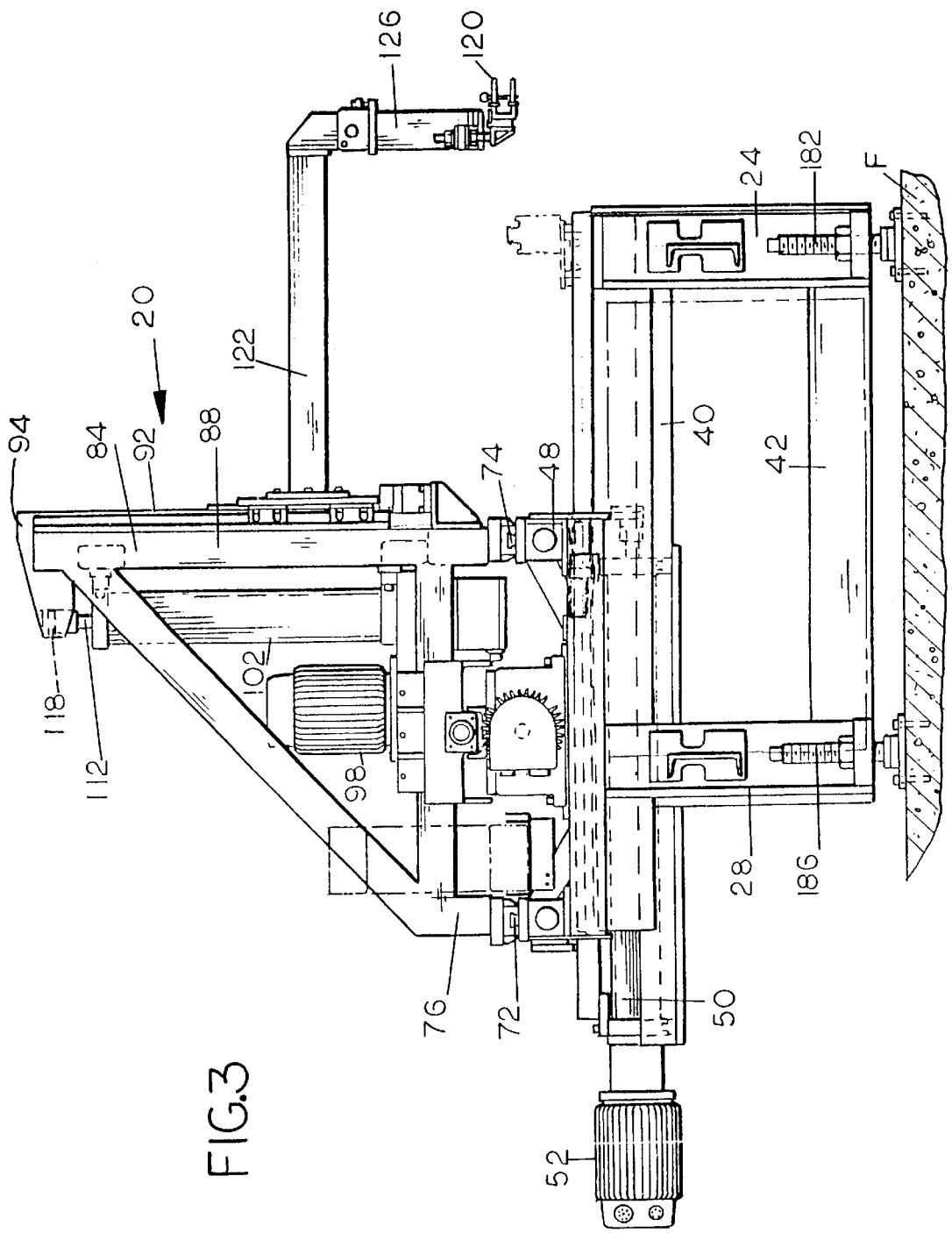
FIG. 3 is a side elevational view of the lehr loader of FIGS. 1 and 2.

The other ends of the rods 110, 112 are secured to a plate 118, and the plate 118, in turn, is secured to the carriage 94, as shown in FIG. 3. Thus, reciprocation of the nut 104, as heretofore described, will cause the carriage 94 to reciprocate in a vertical plane. The use of the rods 110, 112 to longitudinally separate the nut 104 from its attachment to the carriage 94 by the lengths of the rods 110, 112 desirably permits some degree of misalignment between the nut 104 and the carriage 94 due to the inherent flexibility of the rods 110, 112. A linear actuator 96 of the enclosed ball screw type, as described above, like the linear actuators 50, 78, as heretofore described, is available from E Drive Design, Inc. of Glastonbury, Conn. and has the functional advantages over an open ball screw linear actuator that were previously described specifically in reference to the linear actuator 50.

The carriage 94 has a laterally extending pusher bar 120 attached thereto, a pair of spaced apart, longitudinally extending beams 122, 124 with beams 126, 128 extending downwardly therefrom, respectively, being provided to properly position the pusher bar 120 with respect to the lehr L for the intended operation of the pusher bar 120.

Figure 2:
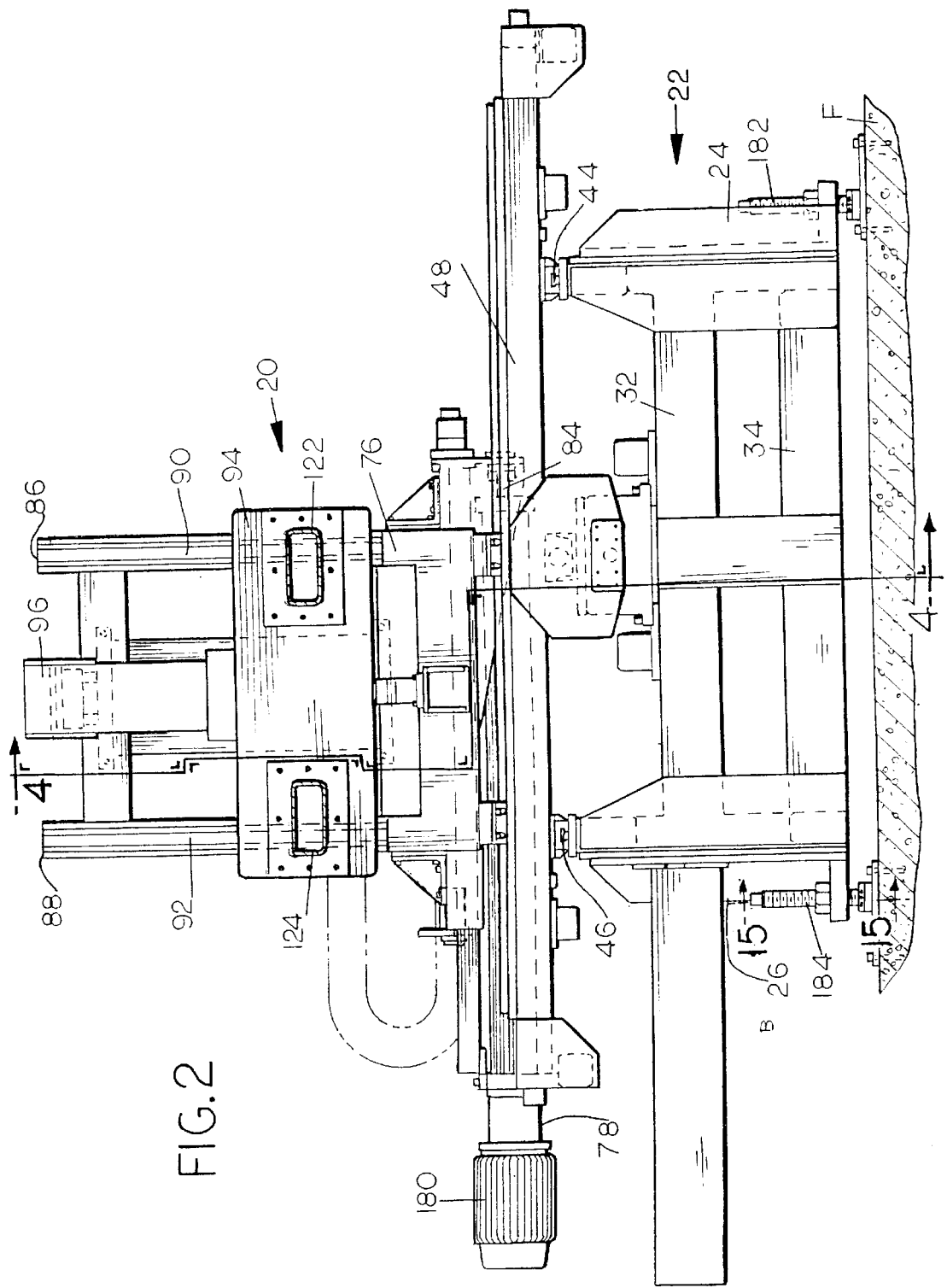
FIG. 2 is a front elevational view of the lehr loader of FIG. 1.

The cycle of operation of the lehr loader 20 begins with the carriage 48 retracted as far as possible from the lehr L, the carriage 76 positioned as far to the left as possible, in the configuration illustrated in FIG. 2, and with the carriage 94 in its lowermost position. Freshly formed glass containers C are presented in a linear array between the lehr loader 20 and the lehr L on and by way of an endless cross-conveyor XC. A row of containers C on the cross-conveyor XC is then advanced from the cross-conveyor XC by advancing the carriage 48 toward the lehr L, as heretofore described. During the advance of containers C to the lehr L, it is necessary to translate the carriage 76 to the right, as heretofore described, to keep incoming containers C on the cross-conveyor XC from colliding with the pusher bar 120. At the conclusion of the advance of a line of containers C into the lehr L, the pusher bar 120 is raised above the tops of incoming containers C on the cross-conveyor XC by raising the carriage 94 as heretofore described, and with cycles that at least partly overlap the raising of the carriage 94, the carriage 48 is retracted away from the lehr L to its start position and the carriage 76 is retracted to the left to its start position and, after the pusher bar 120 is retracted past the tops of the incoming containers C on the cross-conveyor XC, the carriage 94 is lowered to its start position.

Figure 6:
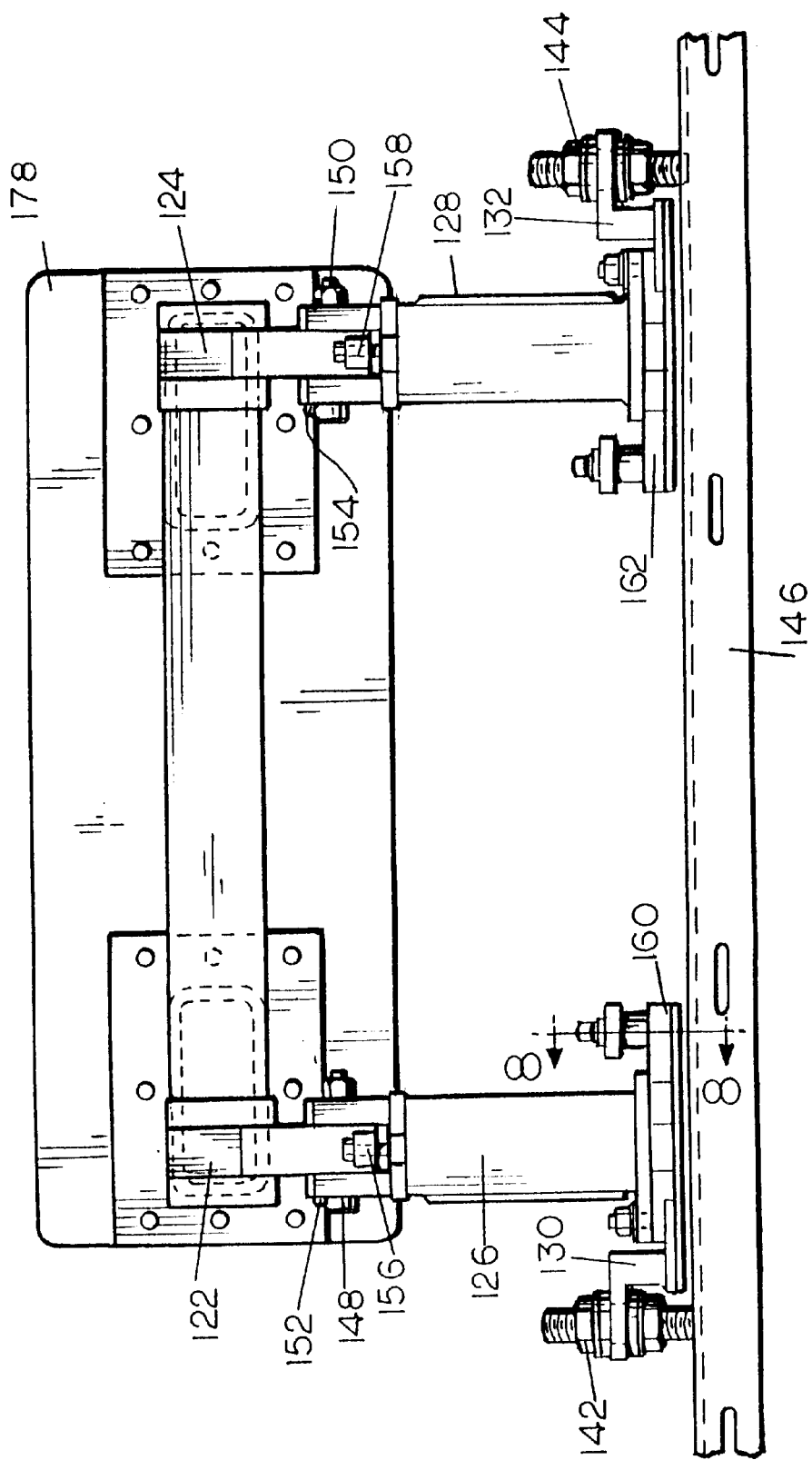
FIG. 6 is a front elevational view, at an enlarged scale, of a portion of the lehr loader of FIGS. 1–5.

The pusher bar 120 is connected to a laterally extending support bar 146 (FIG. 6), and the support bar 146 is connected to extensions 130, 132 of the downwardly extending beams 126, 128, respectively, by like removable pins 134, 136, respectively. The purpose of the removable connection of the pusher bar 120 to the support bar 146 is to permit rapid changing of a pusher bar 120, for example, due to a change in the diameter of the containers C being processed by the lehr loader 20. In that regard, the pusher bar 120 preferably is provided with a container engaging face with a plurality of spaced apart container engaging recesses, preferable defined by a plurality of spaced apart equilateral triangularly shaped attachments secured to the front face of the pusher bar 120, the recesses being sized and spaced in a manner designed for the processing of containers C of a given diameter. Thus, upon a change of the diameter in the containers C being processed by the lehr loader 20, it is important to be able to rapidly change the pusher bar 120 to one whose container engaging face is provided with recesses that are sized and spaced apart differently, and the connection of the pusher bar 120 to the support bar 146, as described, permits such a rapid change in the pusher bar 120.

Figure 7:
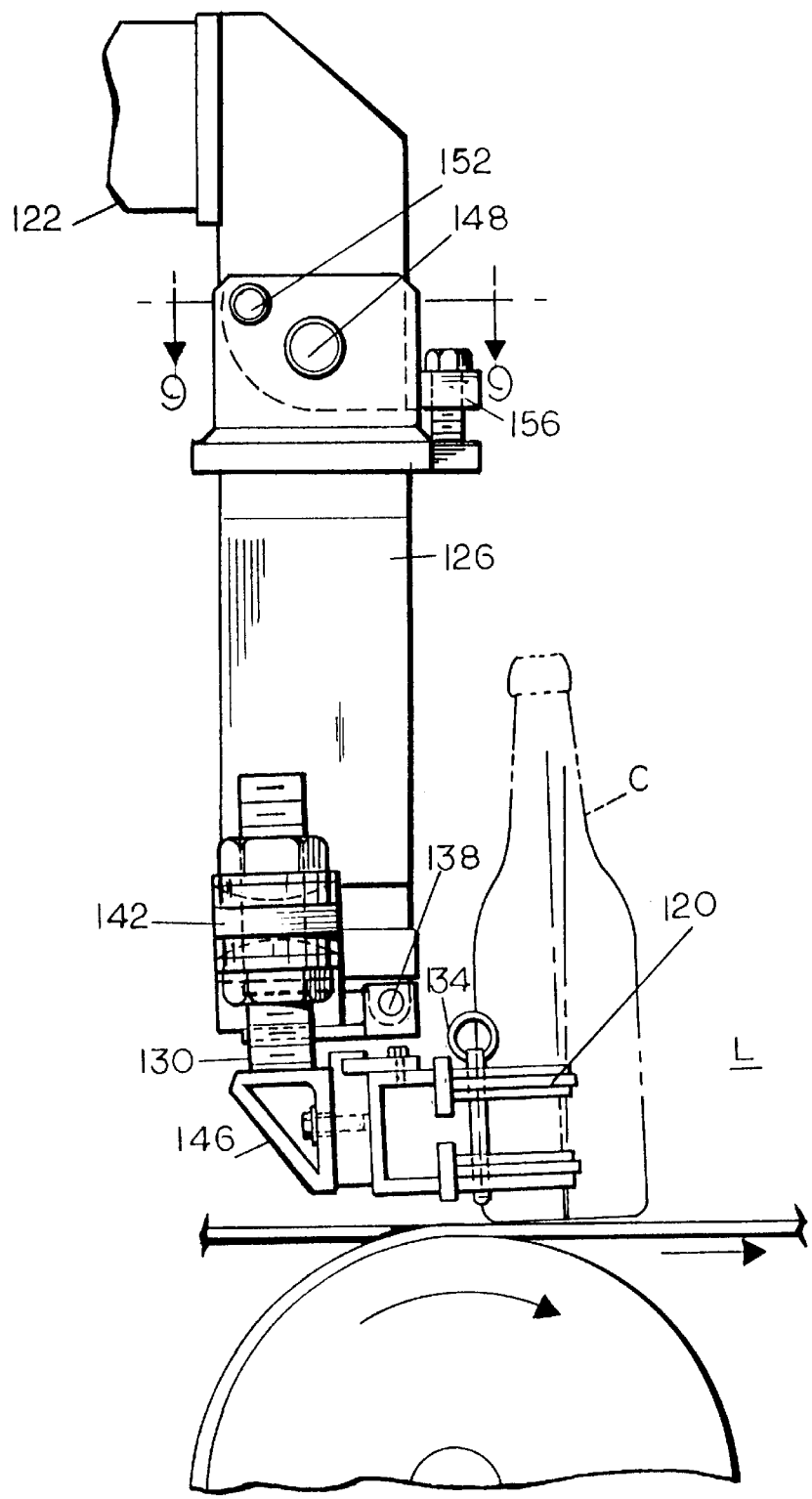
FIG. 7 is a side elevational view, at an enlarged scale, of a portion of the lehr loader of FIGS. 1–5.

The extensions 130, 132 are pivotally connected to the downwardly extended beams 126, 128, respectively, about axes 138, 140, respectively. Threaded adjusters 142, 144, respectively, are provided to permit adjustment of the angle of the pusher bar 120 with respect to containers C that it engages, preferably so that the pusher bar 120 engages the bottom portion of each container C slightly before it engages a higher portion of such container C to impart a slight tilt to the container C away from its direction of motion into the lehr L, as shown in FIG. 7.

The downwardly extending beams 126, 128 are pivotally connected to the longitudinally extending beams 122, 124, respectively, about axes 148, 150, respectively. In normal operation of the lehr loader 20, pivoting of the beams 126, 128 with respect to the beams 122, 124 about the axes 148, 150, respectively, is resisted by shear pins 152, 154, respectively, so that no such pivoting motion will occur. However, in the event of a blockage of the transfer of containers C into the lehr L, the shear pins 152, 154 will fail due to the increased load on the pusher bar 120, and the downwardly extending beams 126, 128 will thereupon rotate through a limited arc with respect to the beams 122, 124, respectively, to thereby retract the pusher bar 120 from engagement with containers C. To permit adjustment in the included angle normally existing between the downwardly extending beams 126, 128 with respect to the longitudinally extending beams 122, 124, respectively, adjustable stops 156, 158 carried by the beams 122, 124, respectively, are provided to assist in properly positioning the pusher bar 120 with respect to the containers C to be engaged thereby.

Figure 8:
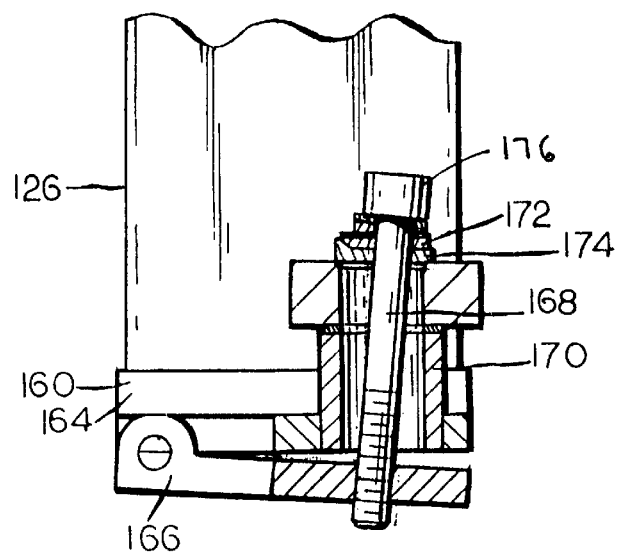
FIG. 8 is a sectional view, at an enlarged scale, taken on line 8—8 of FIG. 6.
Figure 9:
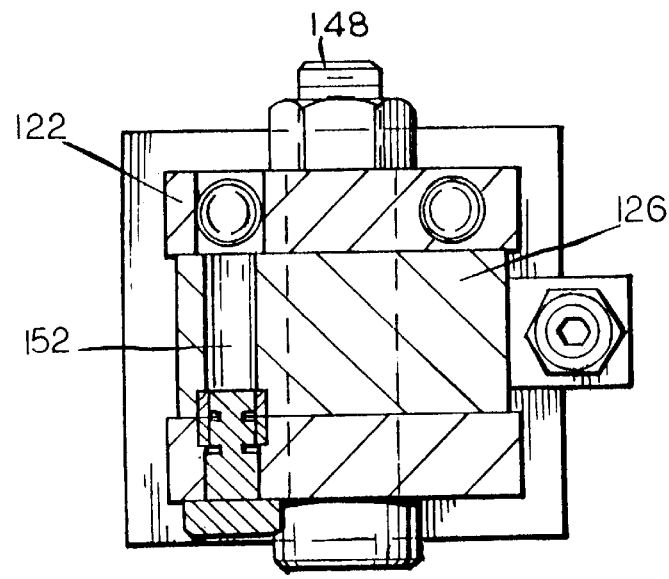
FIG. 9 is a section view taken on line 9—9 of FIG. 7.

To permit adjustment in the position of the support bar 146 and the pusher bar 120 with respect to the downwardly extending beams 126, 128, and thereby with respect to containers C to be engaged by the pusher bar 120, the extensions 130, 132 are connected to the beams 126, 128 by plate assemblies 160, 162, respectively. The plate assembly 160 for the downwardly extending beam 126 is illustrated in FIG. 8, and comprises a first plate 164 that is secured to the beam 126 and a second plate 166 that is pivotally secured to the first plate 164. The orientation of the second plate 166 with respect to the first plate 164 is controlled by a threaded fastener 168 that extends through a boss 170 in the first plate 164 to be threadbare received in the second plate 166. A pair of tapered washers 172, 174 is positioned between a head portion 176 of the fastener 168 and the top of the boss 170. By varying the circumferential orientation of the washers 172, 174 with respect to one another, the angle of the threaded fastener 168 with respect to the downwardly extending beam 126 can be varied, to thereby vary the angular position of the support bar 146 and the pusher bar 120 with respect to containers C. The plate assembly 162 is not specifically illustrated in detail in the drawing, but its design is the same as that of the plate assembly 160.

To shield the linear actuator 96 from thermal radiation from the lehr L and the containers C being processed by the lehr loader 20, a radiation baffle 178 is secured to the carriage 94, preferably to the vertically extending portion of the carriage, preferably to the members 86, 88 thereof Further, to protect many other portions of the lehr loader 20 from thermal radiation from the lehr L and the containers C, a fixed baffle 180 is positioned between the cross-conveyor XC and the portions of the lehr loader 20 beneath and to the rear of the longitudinally extending beams 122, 124 of the carriage 94.

Figure 15:
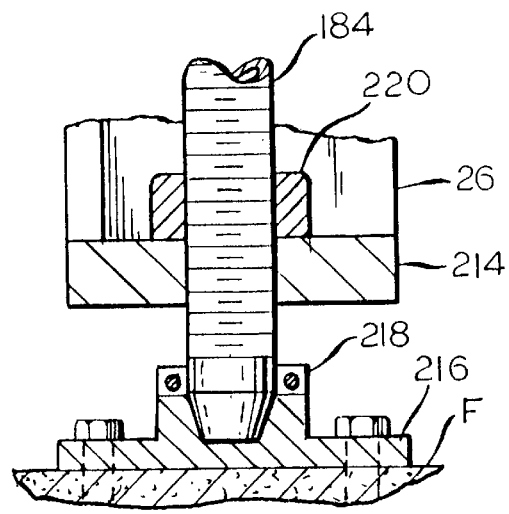
FIG. 15 is a sectional view taken on line 15—15 of FIG. 2.

The horizontally acting servo motors 52, 80 are capable of delivering high levels of torque during rapid acceleration of the carriages 48, 76, respectively, and are capable of braking quite rapidly during the rapid deceleration of such carriages. The loads resulting from such rapid acceleration and deceleration are quite substantial, and would tend to vibrate the legs of the frame 22 from their desired positions with respect to the lehr L unless properly compensated for in the installation of the frame 22. To effect such proper compensation, the legs 24, 26, 28, 30 of the frame 22 are mounted on the threaded members 182, 184, 186, 188, respectively. Members 182, 184, 186, 188, in turn, are securely anchored in a floor F of a glass container manufacturing plant where the lehr loader 20 is installed. Such an installation technique also permits making precise adjustments of the elevation of each of the legs 24, 26, 28, 30 of the frame 22 with respect to the floor F, and it also serves to isolate each of the servo motors of the lehr loader, namely the motors 52, 80 and 98, from the effects of any vibrations occurring in the floor F from any source. The anchoring of the leg 26 to the floor F by way of its threaded member 184 is specifically illustrated in FIG. 15 where the leg 26 is provided with a horizontal flange 214 through which the threaded member 184 passes. A free end of the threaded member 184 is received in a flange 216 that is bolted to the floor F, a split collar 218 being provided to permit adjustment of the position of the threaded member 184 with respect to the flange 216. The vertical position of the leg 26 with respect to the flange 216 is adjustably controlled by a nut 220 that threadbare receives the threaded fastener 184 and bears against the flange 214.

Figure 13:
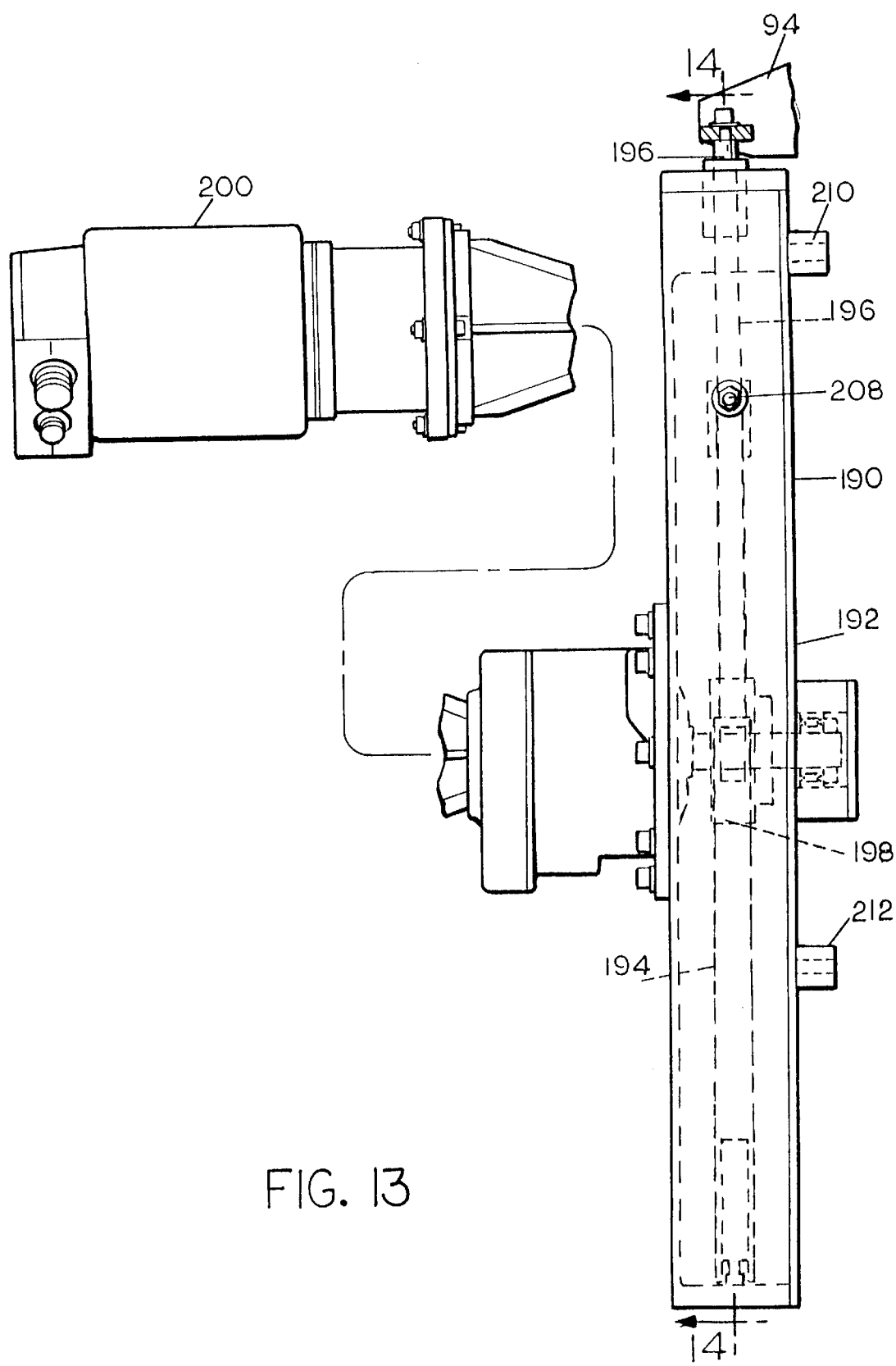
FIG. 13 is an elevational view, partly in cross-section, of an alternative embodiment of an actuation device for use in the lehr loader of FIGS. 1–5.
Figure 14:
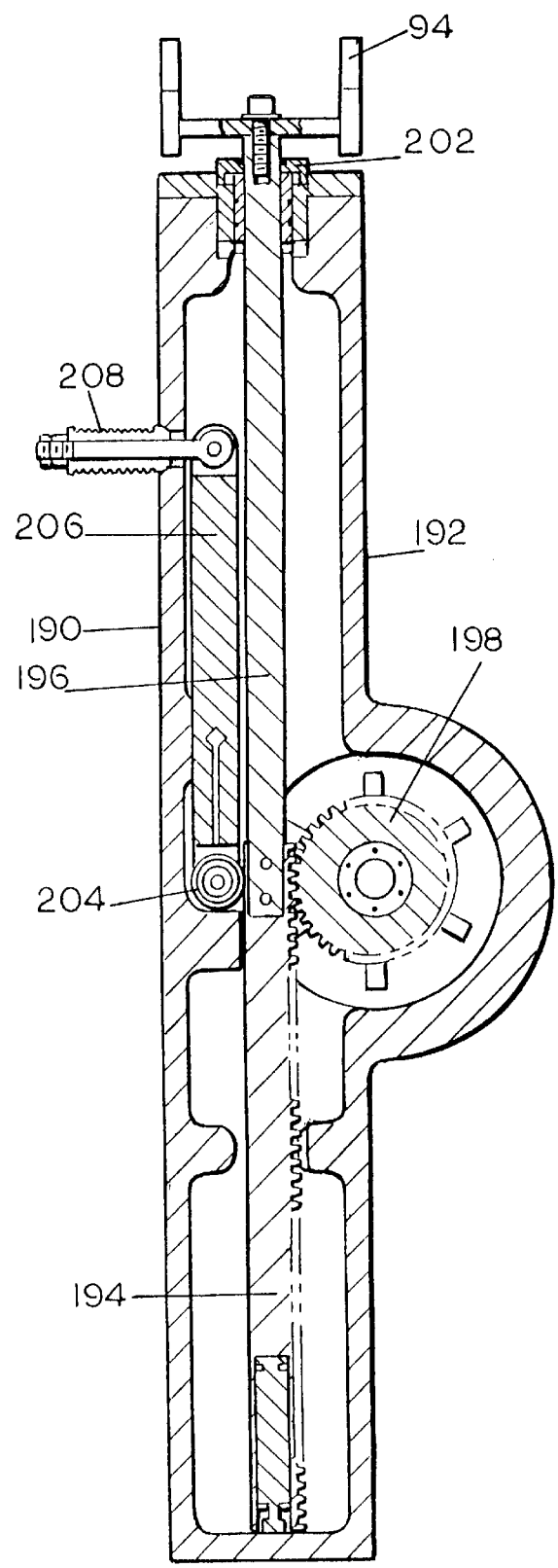
FIG. 14 is a sectional view taken on line 14—14 of FIG. 13.

If desired, the enclosed linear actuator 96 for the carriage 94 can be replaced by an enclosed linear actuator of the rack and pinion type 190 as illustrated in FIGS. 13 and 14. The linear actuator 190 has a housing 192 with a toothed rack 194 positioned within the housing 192. The rack 194 has the inner end of an extension 196 secured to an end thereof, and the outer end of the extension 196 extends beyond the housing 192 and is secured to the carriage 94. The teeth of the rack 194 engage the teeth of a toothed pinion 198, and the pinion 198 is caused to reversibly rotate by virtue of its coaxial connection to a reversible a.c. servo motor 200. The housing 192 is provided with a seal 202 to sealingly accommodate movement of the extension 196 with respect to the housing 192. Proper engagement of the rack 194 and the pinion 198 is provided by a roller 204 that engages the reverse side of the rack 194 in radial alignment with the axis of rotation of the pinion 198, the roller 204 being rotatably mounted at an end of a lever arm 206. The load of the roller 204 on the rack 196 may be adjusted by an adjustment mechanism 208 that acts against the lever arm 206 at a location away from the location of the roller 204. The housing 192 of the linear actuator 190 is provided with inlet and outlet connections 210, 212, respectively, to permit lubricating oil to be continuously circulated through the housing 192, preferably after such lubricating oil has been filtered and cooled, at least by circulating it through lines that are away from the thermal effects of the annealing lehr.

Figure 16:
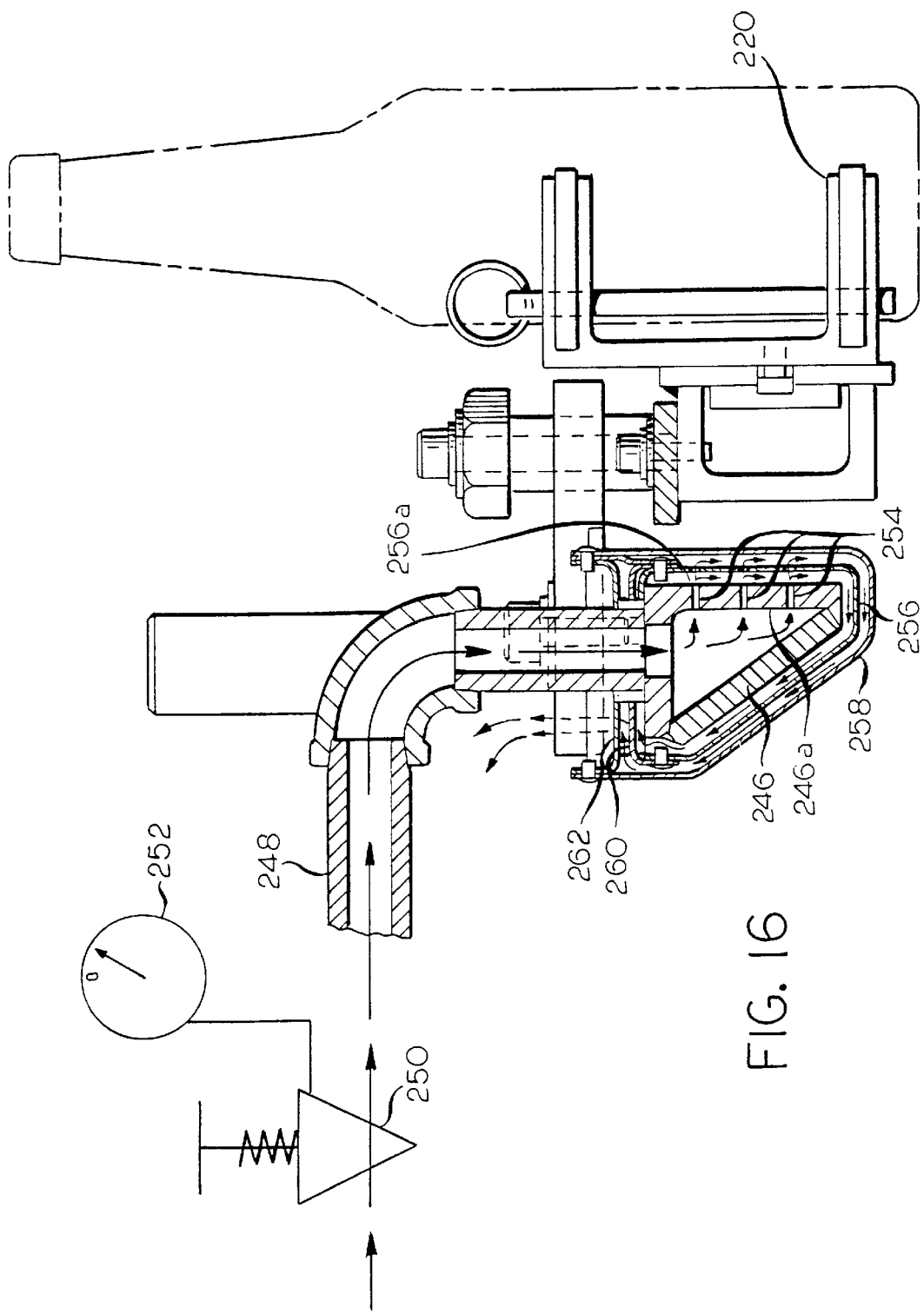
FIG. 16. is a vertical sectional view, partly schematic, of a pusher bar support according to the preferred embodiment of the present invention.

FIG. 16 illustrates a support bar 246 that is an alternative to the support bar 146 of the embodiment of FIGS. 1–15. The support bar 246 is used to support a pusher bar 220 that performs the functions attributed to the pusher bar 120 of the embodiment of FIGS. 1–15. In a typical lehr loader for an annealing lehr that is used to anneal freshly formed glass containers, the support bar 246, which inherently must be quite large in its lateral extent, is subjected to elevated temperatures because of its proximity to an open entrance to a relatively high temperature annealing lehr, and/or to freshly formed containers that still retain significant levels of latent heat from their formation. For example, the glass containers passing through a lehr loader on their way to an annealing lehr are typically at temperatures of at least 1000° F. In such an environment, the support bar 246, if it is not continuously cooled during its operation, can easily reach a temperature of approximately 400° F., and in some instances temperatures of up to approximately 1000° F. An uncooled support bar for a glass container annealing lehr, then, is subject to a considerable degree of dimensional distortion in operation do in part to the temperature levels it is capable of reaching and in part to its substantial lateral extent.

To avoid dimensional distortion in operation, the support bar 246 is continuously cooled by causing compressed air or other fluid coolant to flow therethrough from an inlet line 248, which receives a clean, dry air supply through a solenoid 250 at a pressure that is regulated by a gauge 252. Cooling air from the inlet line 248 flows into the support bar 246, which is annular in cross section, and flows outwardly from the support bar 246 through a plurality of apertures 254 in a generally vertically extending front face 246a of the support bar 246. The cooling effect of the cooling air flowing through the support bar 246 is adiabatically augmented as its pressure drops based on Boyle's law, in which the ratio of the product of inlet pressure and inlet volume to inlet temperature is the same as the ratio of the product of outlet pressure and outlet volume to outlet temperature.

The cooling of the support bar 246 is further augmented by surrounding it with one or more radiation shields, shown as a pair of radiation shields 256, 258. The innermost radiation shield 256 is spaced from the exterior of the support bar 246, preferably by a distance of approximately ⅛ inch, to prevent conductive heat transfer therebetween. Likewise, the outermost radiation shield 258 is spaced from the innermost radiation shield 256, again, preferably, by a distance of approximately ⅛ inch, to prevent conductive heat transfer therebetween.

The cooling air passing through the apertures 254 in the support bar 246 passes into the space between the support bar 246 and the radiation shield 256 and, through apertures 256a in the radiation shield 256, part of such cooling air passes into the space between the radiation shield 256 and the radiation shield 258. Such streams of cooling air then flow, in parallel, around the support bar 246 to exhaust openings 260, 262, respectively, where the spent cooling air, which preferably is at a temperature of no more than 250° F., is exhausted to atmosphere. Preferably, the exhaust openings 260, 262, as shown, are directed away from incoming freshly formed glass containers to avoid subjecting such containers to an unwanted cooling effect.

Although the best mode contemplated by the inventor for carrying out the present invention as of the filing date hereof has been shown and described herein, it will be apparent to those skilled in the art that suitable modifications, variations and equivalents may be made without departing from the scope of the invention, such scope being limited solely by the terms of the following claims and the legal equivalents thereof.

What is claimed is:

1. A support bar for mounting a pusher bar of a lehr loader for transferring freshly formed glass containers at elevated temperatures into an annealing lehr, such support bar comprising:

an elongate member, said elongate member being annular in cross section and having a generally vertically extending front face with a spaced apart plurality of apertures in said front face; and means for introducing a stream of cooling fluid into said elongate member to flow from said elongate member through said plurality of apertures.

2. A support bar according to claim 1 and further comprising;

a first thin metallic radiation shield surrounding said support bar and spaced from said support bar to retard conductive heat transfer between said support bar and said first radiation shield, at least a part of the cooling air flowing from said plurality of apertures flowing in a space between said first radiation shield and said support bar to an outlet from the space.

3. A support bar according to claim 2 wherein the outlet from the space is directed away from freshly formed glass containers entering the lehr loader to avoid subjecting the freshly formed glass containers to an unwanted cooling effect.

4. A support bar according to claim 2 and further comprising;

a second thin metallic radiation shield surrounding said first radiation shield and spaced from said first radiation shield, said first radiation shield having aperture means therein to permit at least another part of cooling air flowing from said plurality of apertures to flow through a second space between said second radiation shield and said first radiation shield to an outlet from the second space.

5. A support bar according to claim 4 wherein the outlet from the second space is directed away from freshly formed glass containers entering the lehr loader to avoid subjecting the freshly formed glass containers to an unwanted cooling effect.

6. A method of cooling an elongate support bar for mounting a pusher bar of a lehr loader for transferring freshly formed glass containers at elevated temperatures into an annealing lehr, the support bar being annular in cross-section and having a generally vertically extending front face with a plurality of apertures therein, said method comprising:

introducing a stream of a cooling fluid into said support bar to flow therefrom through the plurality of apertures.

7. A method according to claim 6 and further comprising:

providing a thin metallic radiation shield surrounding and spaced from said support bar; and causing at least a portion of the cooling fluid flowing from the plurality of apertures of the support bar to flow around the support bar in a space between the support bar and the radiation shield to an outlet from the space.

8. A method according to claim 7 and further comprising:

providing a second thin metallic radiation shield surrounding and spaced from the radiation shield; and causing at least another portion of the cooling fluid flowing from the plurality of apertures of the support bar to flow around the radiation shield in a space between the radiation shield and the second radiation shield to an outlet from the space between the radiation shield and the second radiation shield.

* * * * *

UNITED STATES PATENT AND TRADEMARK OFFICE
CERTIFICATE OF CORRECTION

PATENT NO. : 5,992,613
DATED : November 30, 1999
INVENTOR(S) : Frank J. DiFrank

It is certified that error appears in the above-identified patent and that said Letters Patent is hereby corrected as shown below:

In the drawings:

Sheet 2 of 13, Fig. 2, kindly change reference numeral 180 to 80 as indicated on the attached drawing.

Signed and Sealed this

Tenth Day of April, 2001

Attest:

NICHOLAS P. GODICI

Attesting Officer     Acting Director of the United States Patent and Trademark Office